United States Patent
Vacanti

(10) Patent No.: US 7,825,851 B2
(45) Date of Patent: Nov. 2, 2010

(54) HISTORY OR IMAGE BASED METHODS FOR ALTITUDE DETERMINATION IN A RADAR ALTIMETER

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 12/061,478

(22) Filed: Apr. 2, 2008

(65) Prior Publication Data

US 2009/0058714 A1 Mar. 5, 2009

Related U.S. Application Data

(60) Provisional application No. 60/911,701, filed on Apr. 13, 2007.

(51) Int. Cl.
G01S 13/08 (2006.01)
G01S 13/00 (2006.01)

(52) U.S. Cl. .................. 342/120; 342/118; 342/128; 342/196

(58) Field of Classification Search .............. 342/118, 342/120–124, 128, 196
See application file for complete search history.

(56) References Cited

U.S. PATENT DOCUMENTS

| | | | | |
|---|---|---|---|---|
| 4,568,938 A * | 2/1986 | Ubriaco | ................ | 342/87 |
| 4,670,753 A * | 6/1987 | Vacanti | ................ | 342/90 |
| 4,737,791 A * | 4/1988 | Jean et al. | ............... | 342/124 |
| 4,766,436 A * | 8/1988 | Crepin et al. | ............... | 342/122 |
| 4,847,623 A * | 7/1989 | Jean et al. | ............... | 342/124 |
| 4,958,161 A * | 9/1990 | Allezard | ............... | 342/122 |
| 5,046,010 A * | 9/1991 | Tomasi | ............... | 701/4 |
| 5,448,241 A * | 9/1995 | Zeoli et al. | ............... | 342/25 A |
| 5,477,226 A * | 12/1995 | Hager et al. | ............... | 342/120 |
| 5,923,283 A * | 7/1999 | Gouenard et al. | ........... | 342/120 |
| 5,999,118 A * | 12/1999 | Hethuin et al. | ............. | 342/122 |
| 6,072,422 A * | 6/2000 | Yamada | ............... | 342/70 |
| 6,307,500 B1 * | 10/2001 | Cornman et al. | .......... | 342/26 R |
| 6,977,611 B1 * | 12/2005 | Crabb | ............... | 342/122 |

(Continued)

FOREIGN PATENT DOCUMENTS

EP 0251387 1/1988

(Continued)

OTHER PUBLICATIONS

European Patent Office, "European Search Report", Aug. 11, 2009, Published in: EP.

(Continued)

*Primary Examiner*—Thomas H Tarcza
*Assistant Examiner*—Peter M Bythrow
(74) *Attorney, Agent, or Firm*—Fogg & Powers LLC

(57) ABSTRACT

Methods and apparatus for determining an altitude with an altimeter is provided. One method includes transmitting a signal having a fixed modulation period towards a ground target and then detecting reflected signals off the ground target. The method then implements a single Fast Fourier Transform (FFT) on the detected signals for each modulation period that computes all possible altitudes in real time. A short history of the real time altitude calculations is collected and then the altitude based on the short history of the real time altitude calculations is determined.

20 Claims, 8 Drawing Sheets

U.S. PATENT DOCUMENTS

| | | | |
|---|---|---|---|
| 7,095,364 B1 * | 8/2006 | Rawdon et al. | 342/120 |
| 7,161,527 B2 * | 1/2007 | Vacanti | 342/121 |
| 7,239,266 B2 * | 7/2007 | Vacanti | 342/120 |
| 2006/0044182 A1 * | 3/2006 | Vacanti | 342/120 |
| 2006/0049977 A1 * | 3/2006 | Vacanti | 342/121 |

FOREIGN PATENT DOCUMENTS

| | | |
|---|---|---|
| EP | 0376374 | 7/1990 |

OTHER PUBLICATIONS

Guhua Liu et al., "The Research of Signal Processing Technique of Continous Wave Radar Altimeter", "Radio Science Conference 2004", Aug. 24-27, 2004, pp. 173-176, Publisher: IEEE.

Raney, "The Delay/Doppler Radar Altimeter", "IEEE Transcations on Geoscience and Remote Sensing", Apr. 1, 1997, vol. 36, No. 5, Publisher: IEEE.

* cited by examiner

HISTORY OR IMAGE BASED METHODS FOR ALTITUDE DETERMINATION IN A RADAR ALTIMETER

CROSS REFERENCE TO RELATED APPLICATIONS

This application claims the benefit of U.S. Provisional Application No. 60/911,701, filed on Apr. 13, 2007, which is incorporated herein by reference in its entirety.

BACKGROUND

Aircrafts employ altimeter systems to determine the altitude of the aircraft above terrain. Typical frequency modulation-continuous wave (FM/CW) radar altimeter systems use a single servo loop that attempts to detect a leading edge of a single first return and adjust the parameters of the radar altimeter modulation so as to maintain a constant input frequency to signal processing equipment of the altimeter. In traditional systems only one potential altitude detection is made, ignoring the possibility that the earliest reply is not the ground but some other intervening object such as a tree top, building top, another plane, large machinery top such as construction cranes, rain, etc. This causes the altimeter to display altitudes that are too low and sometimes dangerously too high.

Current altimeter designs also attempt to smooth output altitude by averaging many sequential altitude measurements. Unfortunately this method permits one or more erroneous or large change measurements to skew the final computed value. In particular, prior art altitude tracking schemes revolve around "instantaneous detection" of the "leading edge" or "mean of the return spectrum" of return radar signals on a modulation to modulation period basis. Typically for each modulation period, the computed altitude is averaged with the succeeding period of N periods. This tends to cause any "outlying data points" to pull or skew the computed result. Many existing altitude tracking schemes utilize a suite of system loops that adjust intermediate frequency (IF) automatic gain control (AGC) and the modulation rate which in turn causes the altitude resolution of the altimeter to vary inversely to the altitude—(i.e. less resolution at greater altitude) in addition to the basic altitude tracking loop.

Moreover, existing radar altimeters are frequently based on FM/CM or pulsed modulation. These altimeters compute only a limited altitude extent of range gates centered around where the altimeter is either seeking or tracking ground reflections. These limited altitude extents can mislead the tracking algorithms or incur delays in acquiring or following rapidly changing topology. The tracking loop may be adversely impacted if the rate of change of altitude is greater than the tracking window altitude extent. Algorithms have been demonstrated to indicate greater or lesser altitude than in actually the case because of the need to adjust the limited signal processing extent over constantly changing reflection amplitude and complex ground structures.

For the reasons stated above and for other reasons stated below which will become apparent to those skilled in the art upon reading and understanding the present specification, there is a need in the art for Radar Altimeters that are immune to the effects of a) step change in ground altitude, b) brightness variation in ground reflections, c) rain echo effects, d) aircraft below own aircraft and E) snow/rain/dust covered runways.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of determining an altitude with an altimeter is provided. The method includes transmitting a signal having a fixed modulation period towards a ground target and then detecting reflected signals off the ground target. The method then implements a single Fast Fourier Transform (FFT) on the detected signals for each modulation period that computes all possible altitudes in real time. A short history of the real time altitude calculations is collected and then the altitude based on the short history of the real time altitude calculations is determined.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention use history or image based processing of ground returns collected by the radar altimeter to reduces the effects of a) step change in ground altitude, b) brightness variation in ground reflections, c) rain echo effects, d) aircraft below own aircraft and E) snow/rain/dust covered runways. Moreover, embodiments provide a means to verify the persistence of a measurement over time before including its value in the measurement of altitude. Embodiments also provide a means to compute all possible altitude values from minimum to maximum possible altitude. A signal processor then selects the leading edge of the most distant object as the true altitude of the aircraft, thereby ignoring all intermediate results caused by rain or other aircraft.

One embodiment is implemented by using a frequency modulated (FM)/continuous wave (CW) radar altimeter with a fixed modulation rate and fast fourier transform processing of each individual modulation period. The amplitude of each possible altitude value is threshold detected and saved in a history. The history of each altitude value is then evaluated by counting the number of detections made for each column of the history. An altitude detection is declared when the criteria for the minimum number and distribution of detections is found. Having collected all possible altitude detections, the leading edge of the most distant object is reported. A history of these reported altitudes may be in turn averaged and evaluated on other criteria to arrive at a final reported altitude at the required output data rate.

Figure 1A:
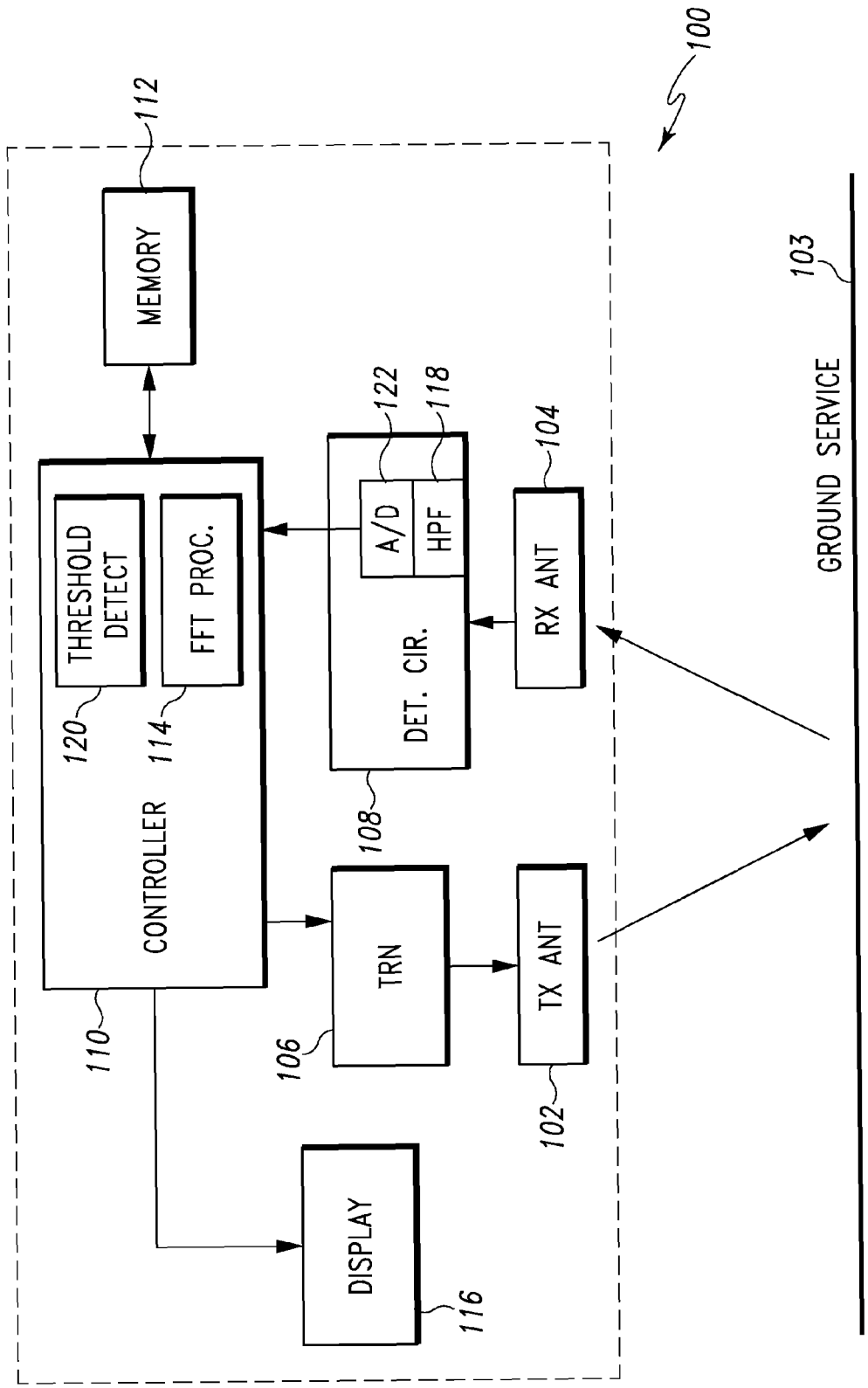
FIG. 1A is an illustration of an altimeter of one embodiment of the present invention.
Figure 1B:
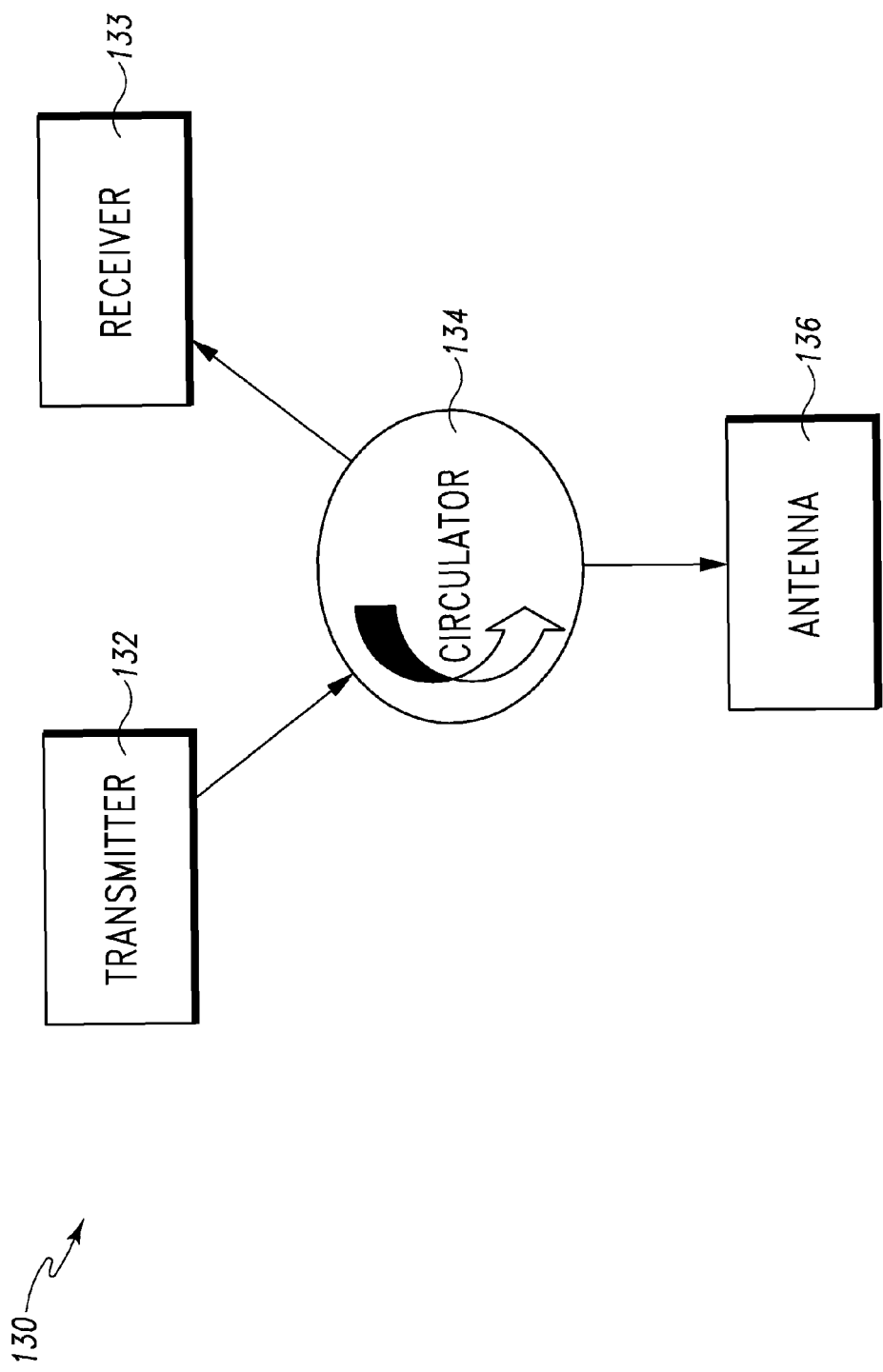
FIG. 1B is an illustration of single antenna altimeter implemented in one embodiment of the present invention.

Referring to FIG. 1A, an example of a radar system 100 of one embodiment is illustrated. In this embodiment, the radar system is a FM/CW altimeter 100. As illustrated, the altimeter 100 includes a transmitter circuit 106 that transmits a signal at a given frequency towards the ground surface 103 via Tx antenna 102. In embodiments, the transmitter circuit 106 transmits at a select fixed modulation rate. The signal is reflected back off the ground surface 103 and picked up by Rx antenna 104 and passed to the detection circuit 108 which includes a receiver. The transmitted signal of FM/CW altimeter varies linearly with time, allowing the distance to the ground to be determined by taking the instantaneous difference between the currently transmitted signal and the received signal. In particular, the detection circuit 108 receives a sample of the transmitter signal 106 and subtracts the reflection signal form the ground to produce a frequency that is directly proportional to altitude. In one embodiment a single antenna system 130 is implemented in the radar system. In this system 130, as illustrated in FIG. 1B, the transmitter 132 and the receiver 133 use a single antenna 136. A circulator 134, a three port device, is used to couple the respective transmitter 132 and receiver 133 to the antenna 136.

Referring back to FIG. 1A, in this embodiment, an automatic gain control loop in the intermediate frequency (IF) subsystem is not used. Instead, a high pass filter (HPF) 118 that is designed to match the lowest and highest frequencies in the IF that corresponds to the highest and lowest altitudes. The filter 118 instantaneously eliminates all variation in amplitude due to change in altitude with no latency over or undershoot. Therefore, a fixed reflector size would not appear to vary regardless of distance. Only the amplitude variation due to reflectivity of a ground target will remain. In one embodiment, a 6 dB per octave HPF is used. As further illustrated in FIG. 1, an analog to digital (A/D) converter 122 is included in the detection circuit 108. The A/D converter 122 is selected to match the dynamic range of the reflectivity. Accordingly, the control processor implements a threshold detection system that only requires a fixed minimum signal to noise ratio to declare a detection of a valid range signal. Therefore an automatic gain control system is not needed.

Altimeter 100 of FIG. 1A, implements a FM/CW modulation rate that produces a constant altitude resolution at all altitudes. In one embodiment a dedicated FFT processor 114 computes a single fast fourier transform (FFT) for each modulation period that computes all possible altitudes in real time. A controller 110 generates and stores a short history of the real time altitude calculations in a two dimensional rolling memory 112 that is capable of holding history. In embodiments, a threshold detection algorithm 120 running either in the FFT processor 114 or the controller 110 is used by the controller 110 on the computed altitudes. The threshold detect algorithm 120 is used by controller 110 on the computed altitudes and as a result assigns pixels in an image of a 1 or a 0 that corresponds to the threshold state of each FFT spectral line which is equivalent to each altitude range gate. The controller 110 determines the altitude based on the short history or image of the threshold data and retains the later fraction of the history as the beginning of the next new history (i.e. push the old history up in the memory stack of a rolling memory 112). The controller 110 computes new FFTs in real time for another history period and fills in a new image.

Controller 110 is capable of performing image processing steps such as passing a "window" over the formed altitude history images while counting and associating pixels with altitude gates. The rolling memory 112 permits retaining a fraction of a previous collected set of threshold detected gates with a fraction of new gates such that trends over time can be recognized. An optional dual processing chain that can provide a self monitoring (2 different solutions) of computed altitude for critical safety of life applications is contemplated and is employed in one embodiment. An example of this embodiment is illustrated in the flow diagram 500 of FIG. 5.

Embodiments compute all possible altitude values at all times and maintains a constant modulation rate from the radar altimeter such that the only variation in measured altitude is caused by aircraft motion and objects on the ground, not caused by changes in the modulation of the altimeter. The algorithms used in embodiments provide the means to determine a distribution of reflections and determine via required persistence over time what values are valid measurements of altitude.

As discussed above, in one embodiment, a FW/CW waveform is used that is processed by using a FFT to produce altitude "gates" or "bin" that correspond one for one with an FFT spectrum line. FM/CM radars encode range to a reflection linearly in frequency wherein a near return produces an output in the FFT at a low frequency spectrum line that typically corresponds to the range/altitude resolution of the radar. Although, the algorithm discussed above is discussed in relation to a FW/CW waveform, the algorithm is not restricted to a FW/CW waveform. For example, a time based pulse system could also be used to form range/altitude gates that would be processed identically after initial amplitude detection. Similarly, any modulation scheme chosen can be used to create a set of range/altitude gates and those gates recorded as a history to create an image are contemplated and included in the present invention.

An image is formed by the controller 110 by collecting range gates for each modulation period. The range gates are threshold detected. Each gate or bin that has an amplitude exceeding a defined threshold is assigned a "1" or an ON pixel for that gate. Each gate that has an amplitude under and including the defined threshold is assigned a "0" or OFF pixel for that gate. A history of N modulated periods is collected in the memory 112 and the "1"and "0" pixels create an image.

Figure 2:
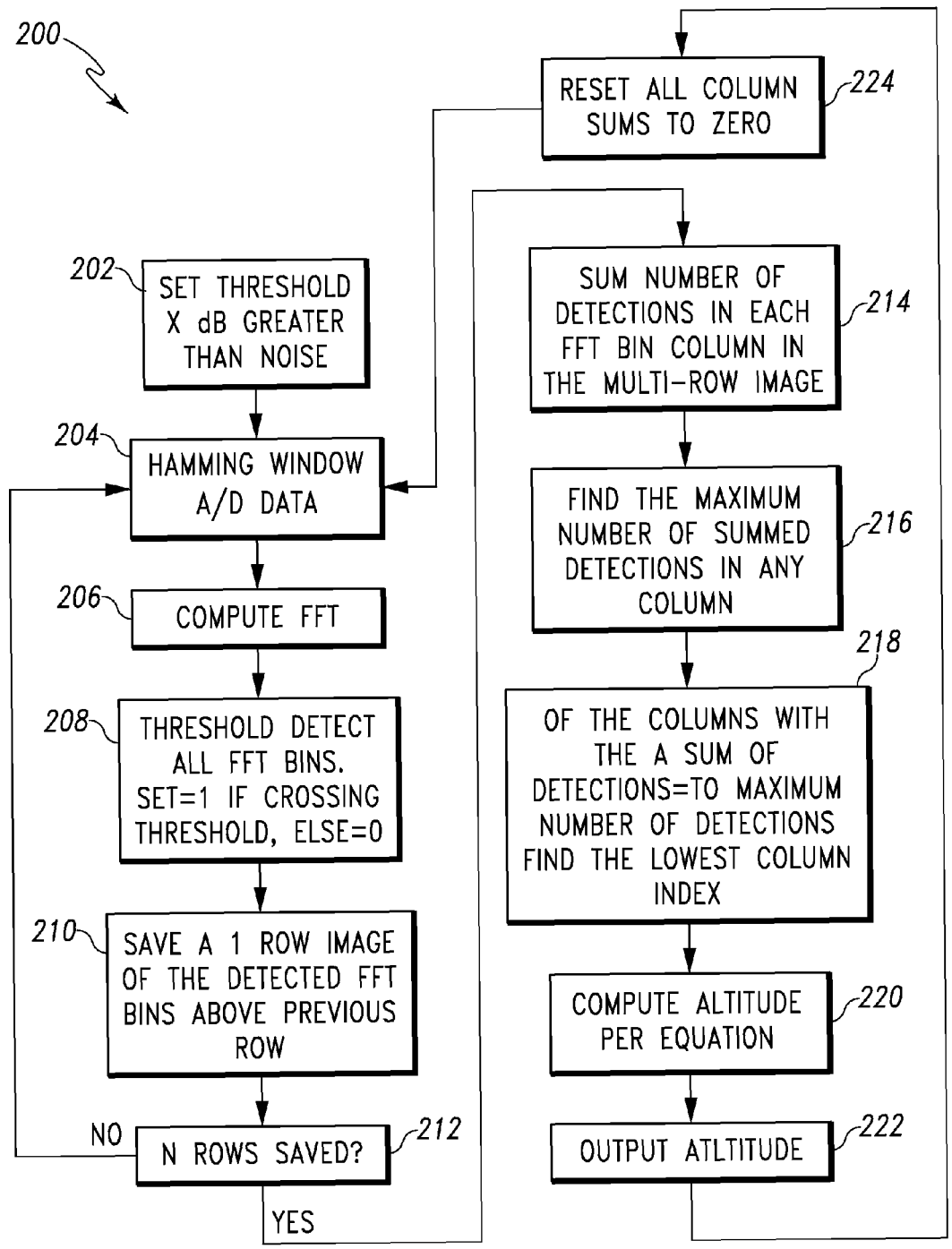
FIG. 2 is a flow diagram of an altitude detection method of one embodiment of the present invention.

Referring to FIG. 2, an altitude detection method 200 of one embodiment is illustrated. As illustrated, the method 200 starts by first setting a threshold X dB that is greater than a noise level (202). Ranging waves are transmitted and return signals are subtracted from a transmitter reference in the receiver to create an IF that is scaled and recorded in the hamming window A/D step (204). The hamming window is a multiplication factor applied to each A/D sample of the IF frequency output. The FFT of the scaled and recorded IF is computed at (206). A threshold detect is applied to the computed FFT and the FFT bins in a history image table are set to a 1 if they cross the threshold or a 0 if they do not (208). A row of the image table of the detected FFT bins above a previous row is saved (210). It is then determined if N rows have been saved (212). If n rows have not been saved (212), the process continues at step (204). Once N rows have been saved (212), each FFT bin column in the multi-row image is summed up (214). The column having the maximum number of summed detections is determined (216). Of the columns with the sum of detections equal to the maximum number of detections, the lowest column index is determined (218). The altitude associated with determined column is then determined (220). The determined altitude is then output (222). All the columns in the image 224 is set to zero (224), and the process continues at step (204).

Figure 3:
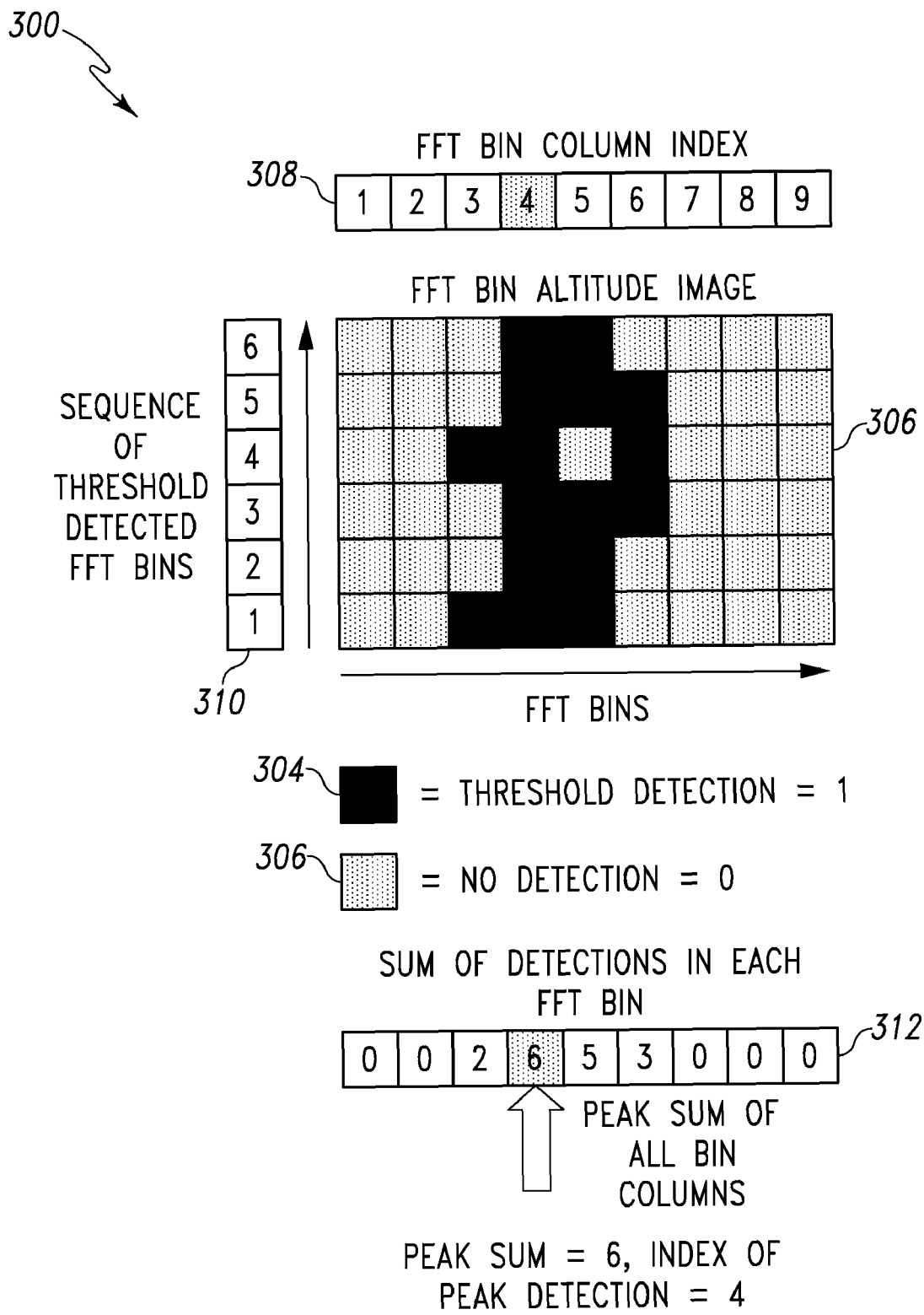
FIG. 3 is an illustration of an altitude detection image of one embodiment of the present invention.

An example of an image 300 is illustrated in FIG. 3. This example of an image 300 is made up of 6 rows and 9 columns. Each square in the image 300 represents a FFT bin. FFT bins that were above the threshold are indicated by the reference number 304. These FFT are assigned a 1 value in one example. FFT bins that were not above the threshold are indicated by the reference number 306. These FFT bins are assigned a 0 value in one embodiment. Each column is associated with a given altitude. Each row indicates a modulation period of detected FFT bins. A FFT bin column index 308 sets out the column numbers. The sum detections in each FFT bin is illustrated in the index of peak detection 312. As illustrated, column 4 has the maximum number of FFT bins (6 in this example) above the threshold. The altitude is then determined based on column 4. An example of an algorithm to determine the altitude is as follows:

$$\text{Altitude} = \text{Altitude Constant} \times \left\{ \text{Index of Peak Sum} - 1 + \frac{\text{Peak Column Sum}}{\text{Peak Column} + \text{Column sum of Sum Peak Index} - 1} \right\}$$

In one embodiment the altitude constant is equal to 3.088 Ft/bin. Using the example illustrated in FIG. 3, the altitude=3.088×((4−1)+(6/(6+2)))=11.58 ft. In one embodiment, a sub-resolve method is used to determine the true altitude when multiple columns of detections are made. For example, in FIG. 3, bin 4 has the maximum possible 6 detections and therefore the altitude may be constructed to be equal to 3.088 FT/bin×4 bins=12.352 ft. But, as FIG. 3 illustrates, column number 5 has 5 detections and column 6 has 3 detections. Accordingly, the true altitude is actually slightly to the left of the position between column 4 and column 5 since bin 5 has one less detection. Had columns 4 and 5 had the same number of maximum detections, the true altitude would be halfway between them or 3.088×4.5=13.896.

Figure 4:
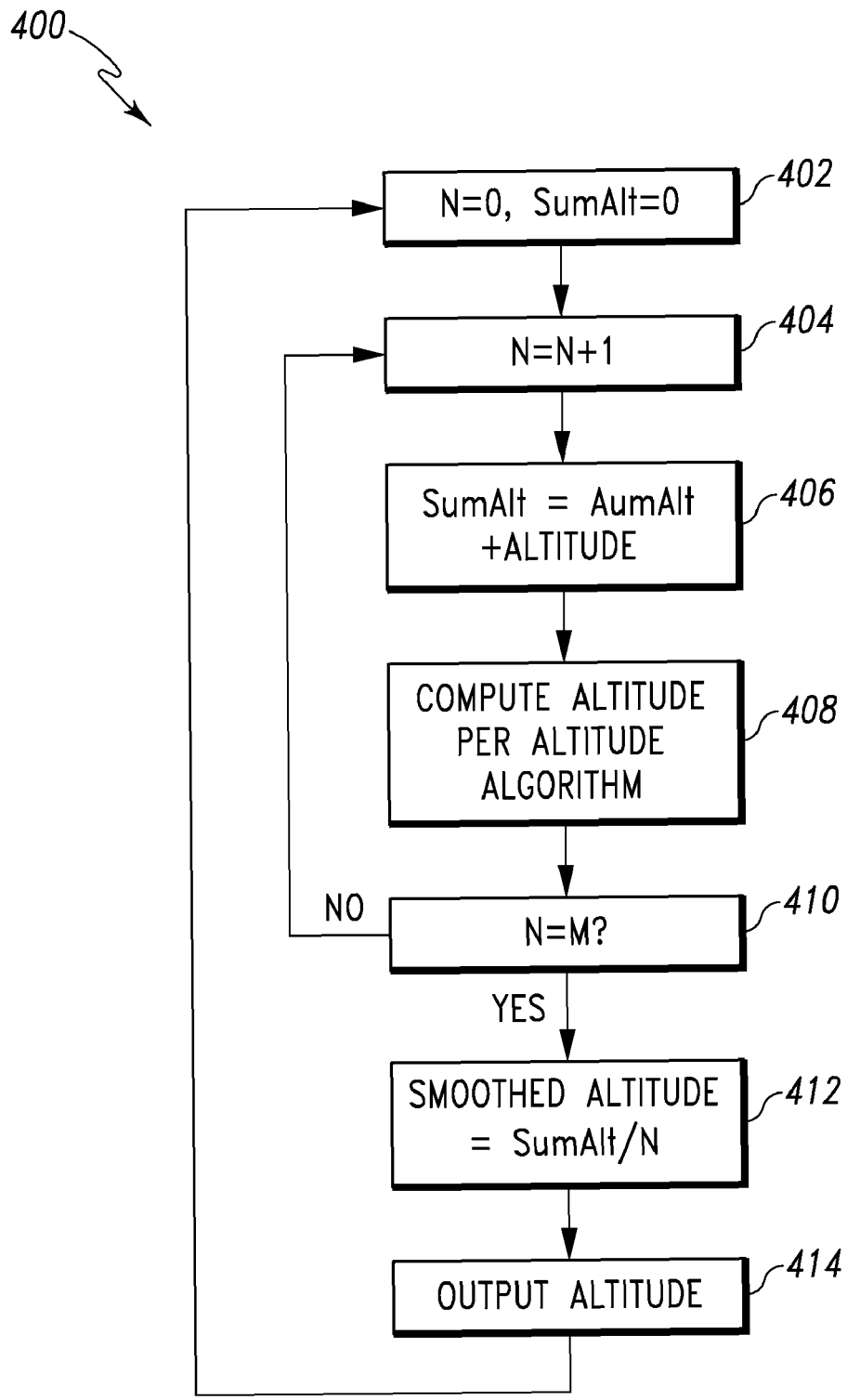
FIG. 4 is a flow diagram of averaging method of one embodiment of the present invention.

In some embodiments, averaging algorithms are used to average a plurality of altitude determination. An example of one averaging method 400 is illustrated in FIG. 4. In this example, the method is stated by first setting a count (N) and a summation of computed altitudes (SumAlt) to zero (402). N is then incremented at (404). The SumAlt is then determined by adding a determined altitude to an accumulated altitude (406). The altitude is computed using an altitude algorithm such as the altitude algorithm as set out above (408). It is then determined if N is equal to the total number of determined Altitudes (M) (410). If N is not equal to M (410), N is incremented at (404) and process continues. Once N equals M at (410), the averaged, or smoothed) altitude is determined by dividing the summation of the computed altitudes by N (412). The smoothed altitude is then output at (414). As illustrated, the process continues at (402).

Figure 5:
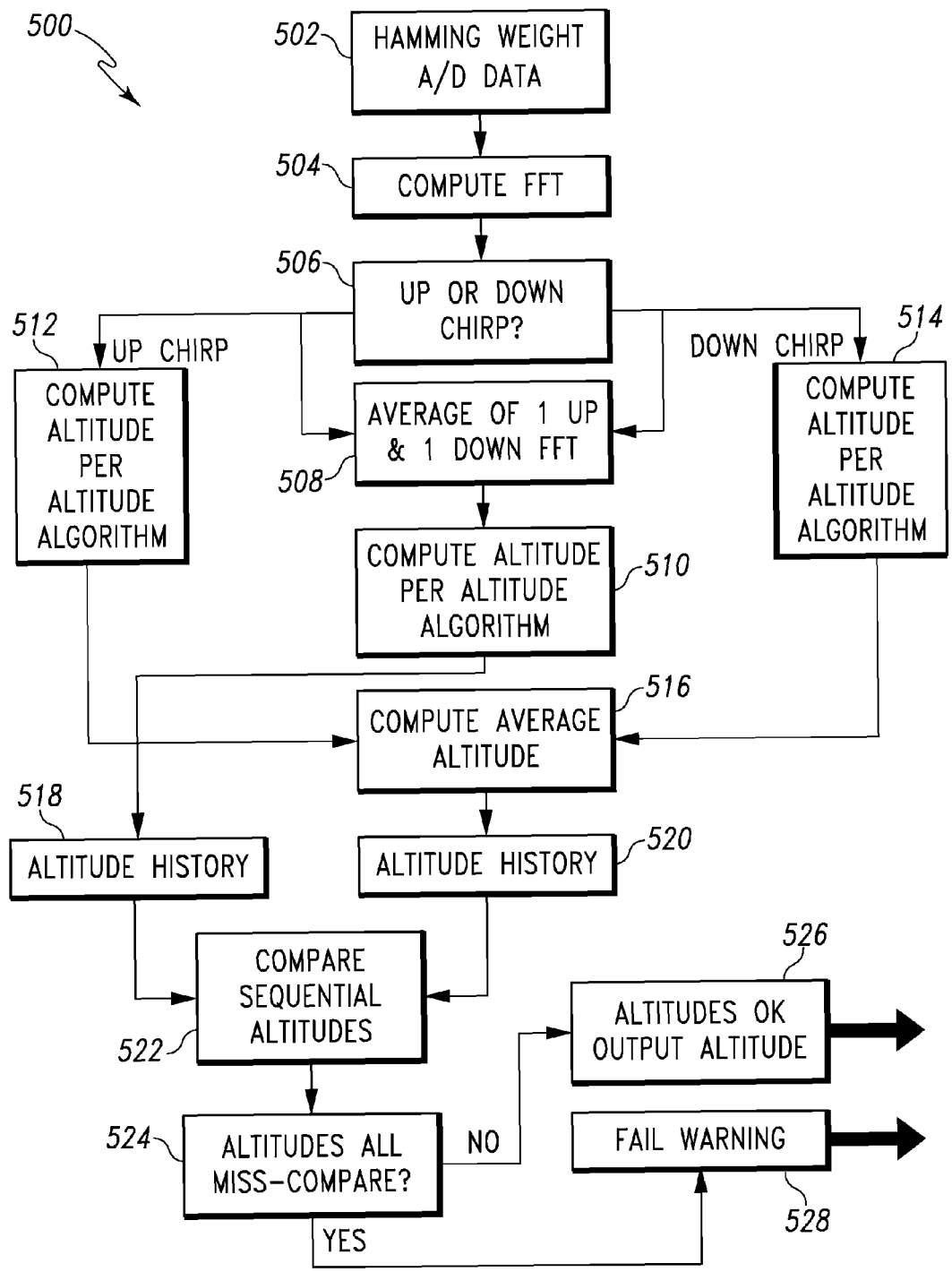
FIG. 5 is a flow diagram of a self monitoring altitude algorithm of one embodiment of the present invention.
Figure 6A:
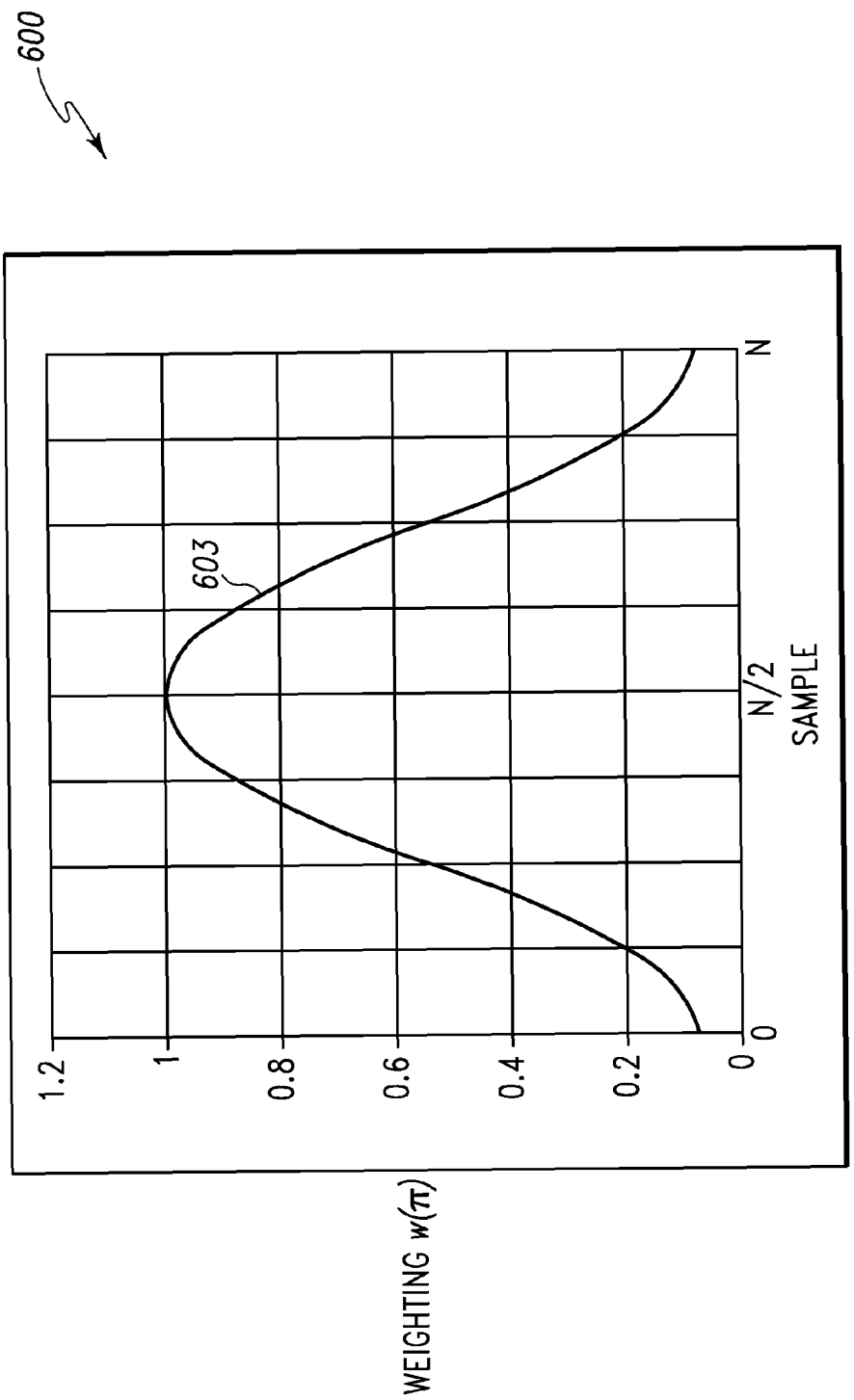
FIG. 6A is an illustration of a hamming window.
Figure 6B:
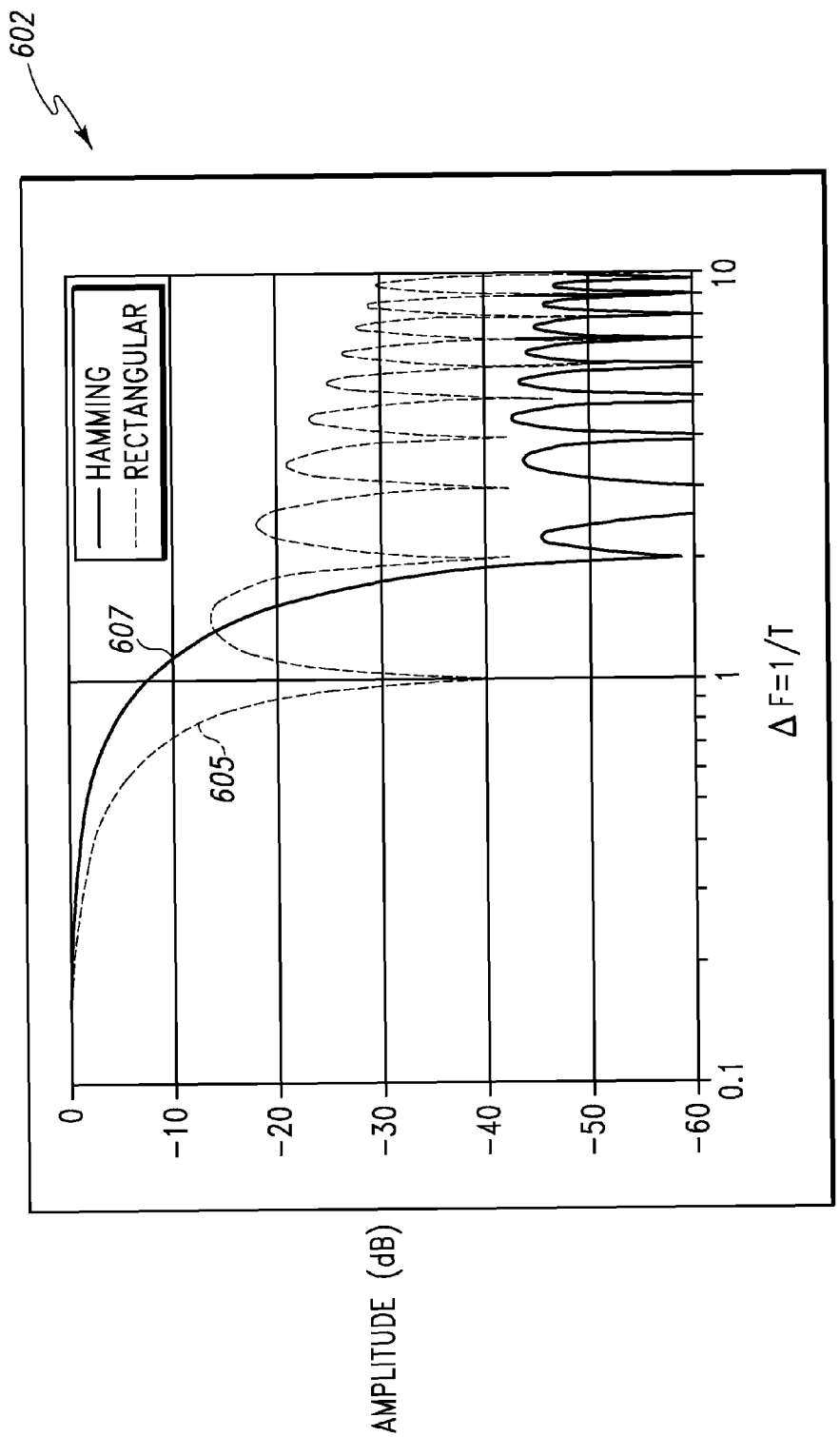
FIG. 6B is an illustration of a hamming window frequency response in an FFT.

In one embodiment, a self monitored altitude algorithm 500 that has two different solutions is applied. This is illustrated in FIG. 5. As illustrated, this method starts by hamming weight A/D data (502). An Example of hamming weight is illustrated in respect to FIGS. 6A and 6B. Data collected by the A/D converter is successfully multiplied by hamming weight according to a well known hamming window 600 illustrated in FIG. 6A. For example, in one embodiment 4096 A/D samples are collected for use by the FFT. According to the weighing schedule 603 of the hammering window 600, the first A/D sample is multiplied by 0.1, while sample N/2 or in this case 4096/2=sample 2084 the recorded A/D sample is multiplied by 1 and the last sample 4096 is multiplied by 0.1. This process is done to reduce the effects of a limited number of data sample points that would otherwise generate "sidelobes" as shown in FIG. 6B. In particular, FIG. 6B shows a hamming window frequency response in an FFT 602 that compares the hamming window 607 to a "rectangular" window. In the rectangular window all weights are equal to 1.0. A hamming window 600 is one example of a data window function. Other optimal functions are contemplated and the present invention is not limited to a hamming window.

Returning back to FIG. 5, once the hamming weight is applied (502), a fast fourier transform (FFT) of a modulation period is computed at (504). It is then determined if the modulation period is an up chirp (going from a low frequency to a high frequency) or a down chirp (going from a high frequency to a low frequency) (506). If it is an up chirp (506), the altitude is computed at (512). If it is a down chirp (506), the altitude is computed at (514). The average of the computed algorithms from (512) and (514) are computed at (516). A result of the computed algorithms is stored in a first altitude history (520). As also illustrated, an average of 1 up and 1 down FFT is computed at (508). The altitude of the average 1 up and 1 down FFT is computed at (510). This computed altitude (510) is then stored in a second altitude history (518). The first and second altitude histories (520) and (518) are then compared at (522). If the altitudes match up (524), the determined altitudes are verified as being ok (526). If the altitudes do not match up (524), a fail warning signal is generated (528).

The methods and techniques used by systems of altimeter 100 including the controller 110 described above can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of determining altitude with an altimeter, the method comprising:
   transmitting a signal having a fixed modulation rate towards a ground target, the fixed modulation rate enabling a constant altitude resolution at all altitudes;
   detecting reflected signals off the ground target;
   implementing a single Fast Fourier Transform (FFT) on the detected signals for a plurality of modulation periods, wherein the FFT computes all possible altitudes in real time;
   comparing FFT output at each altitude to a threshold;
   assigning values to a plurality of FFT bins based on the comparison between the FFT output at each altitude with the threshold, each FFT bin associated with an altitude and a modulation period;
   collecting a short history of modulation periods containing a plurality of FFT bins; and
   determining the altitude based on the short history of modulation periods.

2. The method of claim 1, further comprising:
   retaining a fraction of the history as a beginning of a next new history.

3. The method of claim 1, further comprising:
   computing a new FFTs in real time for another history period.

4. The method of claim 1, wherein FFT bins associated with altitudes where the FFT output exceeds the threshold are assigned a value of 1 and FFT bins associated with altitudes where the FFT output does not exceed the threshold are assigned a value of 0.

5. The method of claim 4, wherein determining the altitude based on the short history comprises:
   summing the assigned values for FFT bins associated with each altitude together; and
   determining the altitude with the maximum summed value.

6. The method of claim 5, further comprising:
   when more than one altitude has the maximum summed value, selecting the lowest altitude having the maximum summed value.

7. A method of determining altitude, the method comprising:
   reflecting signals with a fixed modulation rate off a ground target;
   filtering the reflected signals with a high pass filter;
   applying a fast Fourier transform (FFT) to bin ranges that make up modulation periods in the signals;
   comparing results of the FFT with a threshold to determine valid target signals;
   assigning a first value to bin rages below the threshold and a second value to bin ranges over the threshold;
   forming an image in a memory of rows and columns of FFT bins, wherein each row is indicative of a modulation period and the number of rows is indicative of a select number of modulation periods, each FFT bin storing an associated assigned value based on the comparison;
   determining the column having the most FFT bins with the second value;
   determining an altitude associated with the column; and
   outputting the determined altitude for use.

8. The method of claim 7, further comprising:
   converting the reflected signal from a analog signal to a digital signal with an analog to digital (A/D) converter that matches the dynamic range of the reflected signals.

9. The method of claim 7, further comprising:
   when more than one column has the most FFT bins with the second value, using the lowest numbered column to determine the altitude.

10. The method of claim 7, wherein determining an altitude associated with the column further comprises:
    applying an altitude algorithm.

11. The method of claim 7, further comprising:
    averaging a plurality of determined altitudes to determine a smoothed altitude.

12. The method of claim 7, further comprising:
    validating output altitudes.

13. The method of claim 12, wherein validating output altitudes further comprises:
    applying the FFT to bin ranges that make up modulation periods during an up chirp;
    determining an altitude associated with the up chirp modulations;
    applying the FFT to bin ranges that make up modulation periods during an down chirp;
    determining an altitude associated with the down chirp modulations;
    determining an average altitude with regards to the altitudes associated with the up chirp and down chirp modulations;
    averaging the FFT associated with one up chirp modulation and one down chirp modulation;
    determining an altitude associated with the averaged FFT associated with one up chirp modulation and one down chirp modulation; and
    comparing the determined average altitude with regards to the altitudes associated with the up chirp and down chirp modulations with the determined altitude associated with the averaged FFT associated with one up chirp modulation and one down chirp modulation to validate an altitude determination.

14. A radar altimeter comprising:
    a transmitter circuit configured to transmit signals at a fixed modulation rate that produces a constant altitude resolution at all altitudes;
    a detection circuit configured to detect reflected signals from the transmitter circuit;
    a controller configured to implement a fast fourier transform (FFT) on the reflected signals to determine a FFT spectral line having a plurality of bin ranges for each modulation period, the controller further configured to apply a threshold detect algorithm that outputs a value in an associated FFT bin based on a comparison of each determined FFT spectral line bin range and a set threshold; and a memory configured to store history of the output value in each FFT bin for each modulation period, wherein the controller is further configured to determine an altitude based on the stored history.

15. The radar altimeter of claim 14, wherein the controller further comprises:

a FFT processor to implement the FFT.

16. The radar altimeter of claim 14, wherein the memory is further configured to store the history for each FFT bin in a plurality of rows and columns, wherein each row is representative of a modulation period and the number of rows is representative of the number of modulation periods selected, further wherein the controller is configured to determine the then current altitude by determining which column has most FFT bins that have a value indicative of being over the threshold.

17. The radar altimeter of claim 14, further comprising:

an high pass filter (HPF) configured to filter the reflected signal; and an analog to digital (A/D) converter coupled between the HPF and the controller.

18. The radar altimeter of claim 17, wherein the A/D converter matches a dynamic range of the reflected signals.

19. The radar altimeter of claim 14, wherein the memory is a rolling memory configured to retain a fraction of a previously collected set of FFT bins such that trends over time can be recognized.

20. The radar altimeter of claim 14, further comprising:

a display coupled to the controller to display determined altitudes.

* * * * *